United States Patent [19]

Ebrey et al.

[11] 4,397,084

[45] Aug. 9, 1983

[54] CONDUCTOR ESCAPEMENT APPARATUS

[75] Inventors: Roger G. A. Ebrey, Snellville; Herbert A. Sckerl, Norcross, both of Ga.

[73] Assignee: Western Electric Company, Inc., New York, N.Y.

[21] Appl. No.: 266,272

[22] Filed: May 22, 1981

[51] Int. Cl.[3] .................. B23P 19/00

[52] U.S. Cl. .................. 29/749; 29/753; 29/759

[58] Field of Search .................. 29/461, 747, 749, 759, 29/760, 753, 426.5; 198/459

[56] References Cited

U.S. PATENT DOCUMENTS

| | | | |
|---|---|---|---|
| 2,828,888 | 4/1958 | Nicolle | 221/263 |
| 4,034,472 | 7/1977 | Cover et al. | 29/749 |
| 4,107,838 | 8/1978 | Keen et al. | 29/753 X |

*Primary Examiner*—Jeffrey V. Nase
*Assistant Examiner*—Dennis J. Williamson
*Attorney, Agent, or Firm*—E. W. Somers

[57] ABSTRACT

An escapement apparatus of this invention accepts a contiguously arrayed plurality of conductors and dispenses them into a carrier spaced apart on centers to facilitate their assembly to a ribbon connector. The escapement apparatus includes a guideway having a first portion which receives the conductor array and which is inclined at an angle to the horizontal. The array is received in the first portion of the guideway and a second, more steeply inclined portion and is biased toward an exit. The exit communicates with a passageway along which is moved a toothed carrier. The carrier includes a plurality of nests having a spacing which corresponds to that of the connector. As the carrier is moved at a velocity which is controlled relative to forces applied to the conductor array in the guideway, the nests are aligned seriatim with the exit to facilitate the movement of a conductor into each nest. The angle of incline of the second portion of the guideway is such that only one conductor is presented to the exit at any one time. Further, the geometry of each tooth and of the second portion of the guideway cooperate to prevent any jamming of a conductor between the carrier and the guideway.

5 Claims, 8 Drawing Figures

CONDUCTOR ESCAPEMENT APPARATUS

TECHNICAL FIELD

This invention relates to an escapement apparatus for insulated conductors and more particularly to an apparatus for receiving end portions of a plurality of conductors in contiguous relationship and for causing them to be rearranged in spaced relation to one another.

BACKGROUND OF THE INVENTION

Connectors which are adapted to connect a plurality of conductors have been in widespread use for many years in the communications industry. Earlier multi-conductor connectors of the prior art employed soldered connections in which each conductor was soldered to a metal contact element of the connector in a step which required both time and care to assure a desired, secure connection.

In recent years, numerous forms of solderless connectors have been developed and gained wide usage. These are called ribbon-type connectors or high density systems in which a plurality of conductors are terminated in closely adjacent relationship. See, for example, U.S. Pat. Nos. 4,113,337 and 3,902,154.

Ribbon connectors of the type referred to herein normally employ a body of electrically insulating plastic which has formed therein a plurality of conductor-receiving channels in which conductors are received and engaged by metallic terminating contact elements. The contact elements extend through the thickness of the plastic body, and have exposed mating portions adapted to engage with mating portions of another connector. This arrangement allows an electrical connection to be established between female and male connectors, or connectors more commonly known as receptacle and plug types, respectively.

In conjunction with the developments in ribbon-type connectors, various apparatus have been proposed for inserting conductors into such connectors. One example of such an apparatus is disclosed in U.S. Pat. No. 3,997,956. In another apparatus for successively terminating individual conductors of a group in separate contact elements along the length of a connector, each conductor is moved along a first path generally transversely of its longitudinal axis into a contact element of the connector. Conductor locating stops are disposed opposite the open sides of the contact elements of a connector for orienting a conductor portion in a first position in spaced relation to the connector. The longitudinal axis of the conductor is substantially parallel to the axis of the respective contact element. Then the conductor is transferred from the first position into the respective contact element while maintaining the parallel relationship. The conductor is trimmed and is gripped to assure proper positioning of the conductor axially of its length throughout the transfer and insertion operation. See U.S. Pat. No. 4,034,472.

While the ribbon-type connector termination apparatus described above is a substantial improvement over prior art fixtures which held a connector while an operator inserted conductors, it is only semi-automatic and requires manual selection of conductors and their movement into alignment with contact elements. Considering the enormous number of these kinds of connectors which are terminated on an annual basis, it becomes attractive to design apparatus for their automatic assembly with conductors.

Apparatus has been implemented which selects end portions of insulated conductors which extend from a multi-conductor cable in the order in which they are to be assembled to the connector. See U.S. Pat. No. 4,107,838 which issued on Aug. 22, 1978 in the names of Ralph H. Keen et al. In that apparatus, the conductors in their ordered sequence are in contiguous relation to one another and are assembled to the connector in spaced relation as the connector is indexed. The insertion process requires that the ordered conductors be spaced apart on centers equal to the spacing of the contact elements in the connector. What is needed is an escapement apparatus for receiving a contiguous array of conductors and for spacing them apart while maintaining their order.

The prior art abounds with apparatus for dispensing articles. For example, in U.S. Pat. No. 2,828,888, disc-like articles are dispensed singly from a chute partially into a receiving nest of a moveable table. In U.S. Pat. No. 4,071,948, a distribution of annular workpieces is made from a magazine which is inclined at an angle to a plate surface from which a plurality of bolts are upstanding. Articles in U.S. Pat. No. 3,972,407 are transferred from a vertically disposed hopper singly into nests of a reciprocating slide.

What the prior art does not show and what is needed in order to provide an automatic apparatus for terminating a ribbon-type connector is an escapement apparatus for receiving conductors in an ordered contiguous array and for rearranging the conductors in a spaced ordered array.

SUMMARY OF THE INVENTION

The foregoing needs are provided with an escapement apparatus of this invention. The apparatus includes a guideway having a first portion for receiving an array of end portions of a plurality of conductors in contiguous relationship to one another. As a result of previous operations, the conductors in the array are in an ordered sequence which corresponds to the sequence in which they are to be assembled to the connector. The end portions protrude past the open face of the guideway and may be supported in engagement with an abutment. Adjacent to an escapement end of the device is a second portion of the guideway which communicates with the first portion and which is inclined at a steeper angle than the first.

A carrier having a plurality of spaced teeth upstanding therefrom is mounted slidably adjacent to the end of the second portion of the guideway with conductor-receiving nests formed between the teeth. The carrier is moved to position the nests seriatim in alignment with a lower end of the guideway with the leading one of the conductors being received in the aligned nest. As the carrier is moved, the next successive conductor rides downwardly along a camming surface toward and into the next successive nest.

The steeper angle of the second portion of the guideway and the camming surfaces cooperate to prevent any jamming of the leading conductor. Further, the steeper angle of the second portion of the guideway causes its opening to the carrier to be sufficiently wide for only one conductor end portion thereby avoiding a double feed.

The velocity of the carrier is controlled to insure that each nest is filled with a conductor. That velocity is capable of being adjusted with respect to the movement of the conductor end portions along the guideway.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
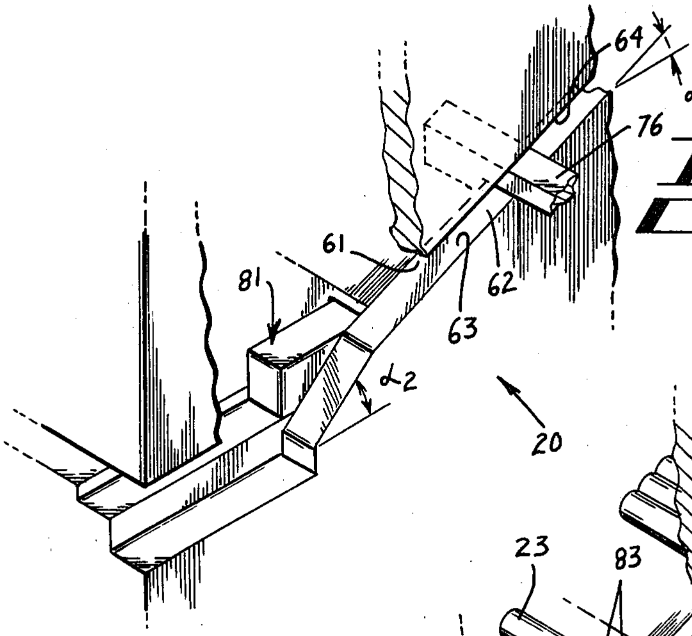
FIG. 1 is a perspective view of an escapement apparatus of this invention which receives a plurality of contiguously arrayed conductors and which dispenses them in spaced relation to one another.
Figure 2:
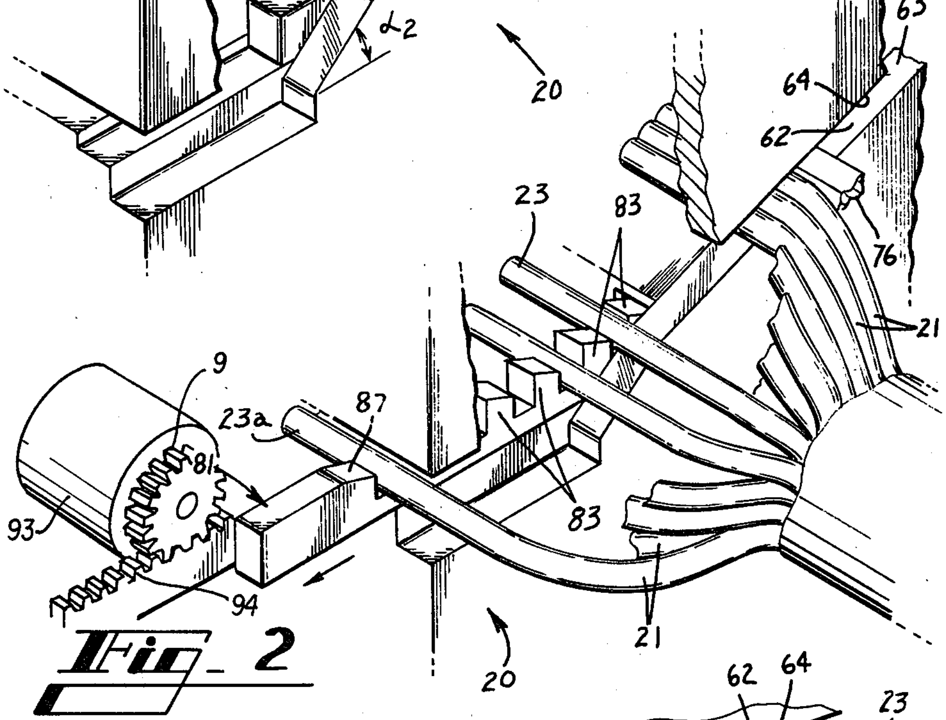
FIG. 2 is a perspective view of the escapement apparatus of FIG. 1 to show a carrier portion thereof with nests being formed in the carrier.

Referring now to FIGS. 1 and 2, there is shown an apparatus 20 for accepting a contiguous array of insulted conductors 21—21 and for rearranging them in spaced relation to one another. The spaced relation is necessary to facilitate the automatic insertion of end portions 23—23 of those conductors with a ribbon-type connector. It becomes far easier to feed the end portions of the conductors 21—21 to an assembly station in their spaced positions rather than to attempt to space them apart as they are moved into engagement with the ribbon-type connector 22.

Figure 3:
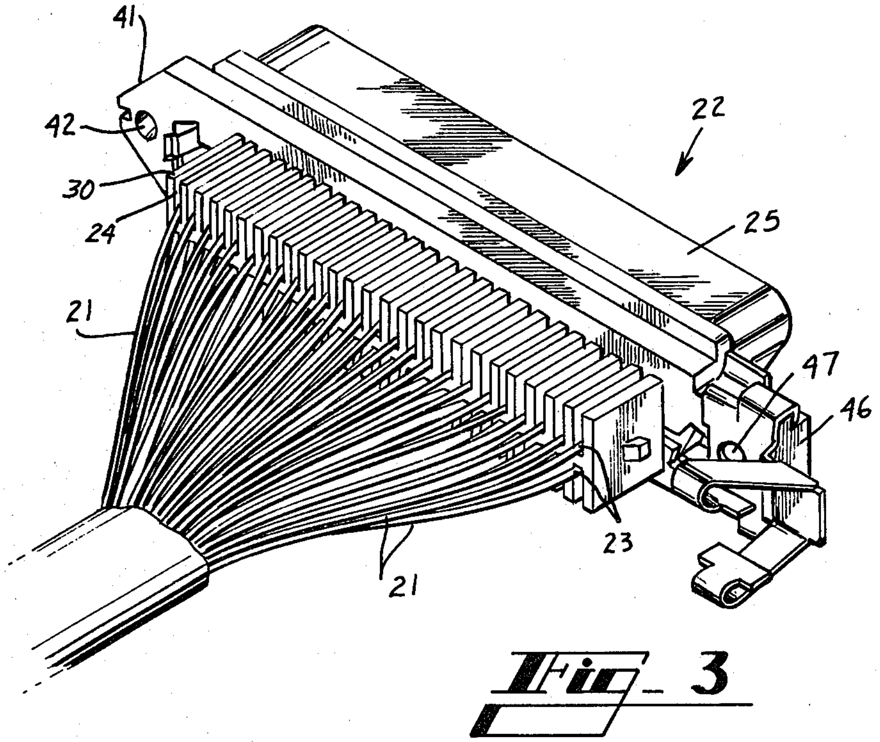
FIG. 3 is a perspective view of the conductors, which are spaced apart by the escapement apparatus of this invention, assembled to a ribbon type connector.

Referring now to FIG. 3, there is shown a typical ribbon connector 22 with end portion of conductors attached. The ribbon-type connector 22 includes a body 25 which is made of a dielectric material, is well-known in the industry and is shown for example in priorly mentioned U.S. Pat. Nos. 4,214,803, 4,113,179 and 4,113,337, each of which is incorporated by reference hereinto.

The ribbon-type connector 22 is elongated and comprises the dielectric body 25 having a plurality of spaced barries 30—30 which define channels 24—24 for receiving individual contact elements (not shown). Each of the contact elements is metallic and includes one portion which engages with a corresponding contact element of a complementary connector while another portion is electrically connected, such as by soldering, crimping or insulation piercing techniques to an individual conductor of a cable which is terminated by the ribbon-type connector 22.

The dielectric body 25 includes a cavity with which the channels 24—24 communicate. The cavity has uninterrupted inner sidewalls with apertures formed between each inner wall and an associated external sidewall 38. The contact elements are mounted within the body 25 so that the one portion of each is disposed in a channel and so that the other portion of each extends along an inner wall and is then turned into an associated aperture. The connector 22 which is depicted in FIG. 3 is adapted to have a complementary connector received in its cavity such that contact elements of the complementary connector engage those of the connector 21.

The connector body 25 is formed to have a front end flange 41. The flange 41 includes at least a partially threaded aperture 42 and may have undercut edge portions. At the other end of the elongate body 25, a flange 46 is formed. That flange also includes at least a partially threaded aperture 47, a ledge on each side of the flange and an overhang 49 between each ledge and an end of the body 25.

As can be inferred from FIG. 3, the contact elements which are positioned in the channels 24—24 are spaced apart on predetermined centers. The apparatus of this invention is effective to space apart the end portions of the conductors to correspond to the spacing between the contact elements of the connector 22.

Referring again to FIGS. 1 and 2, it is seen that the apparatus 20 includes a guideway 61 for receiving the contiguously arrayed plurality of conductor end portions 23—23. The guideway 61 includes a first portion 62 having an angle of inclination $\alpha_1$ to a horizontal axis. The guideway 61 is constructed so that a normal extending between surfaces 63 and 64 which define the guideway is slightly larger than the outer diameter of one of the insulated conductors.

Figure 4:
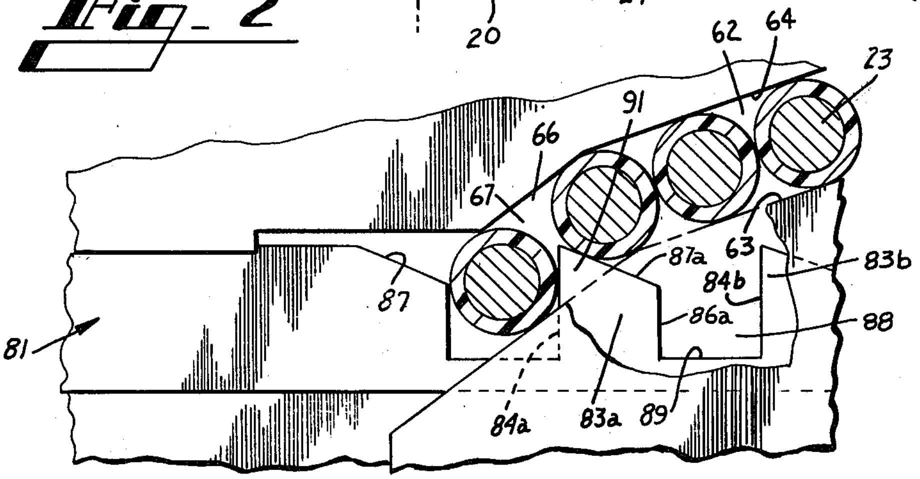
FIG. 4 is an enlarged view of a portion of the escapement apparatus of FIG. 1.

Viewing FIGS. 1, 2 and 4, it is seen that the guideway 61 also includes a second portion 66 which communicates with the first portion 62. The second portion 66 of the guideway is also dimensioned to be slightly greater than the outer diameter of the conductor 23, but it is inclined to the horizontal axis at an angle $\alpha_2$ which is greater than that of the first portion. The second portion 66 terminates in an exit end 67 from which the end portions are escaped.

While not shown in the preferred embodiment in the drawings, the apparatus 20 may also includes a shelf which is used to support the end portions of the conductors that extend across the guideway 61. The shelf includes a first portion which parallels the first portion 62 of the guideway and a second portion which parallels the second portion 66 of the guideway.

In order to move the end portions 23—23 of the conductors 21—21 along the guideway 61, the apparatus includes a feed means such as a pusher 76 which is biased by a spring (not shown) toward the exit end 67 of the guideway. Once loaded into the guideway 61, the contiguously arrayed end portions of the conductors 21—21 are biased toward the exit end 67 of the guideway by forces which are applied by the pusher 76.

The transport of the conductors 21—21 to a station where they are assembled with a ribbon connector 22 is accomplished with a carrier 81 which may be in the form of a rack (see FIGS. 2 and 4). The carrier 81 includes a plurality of upstanding teeth 83 with each tooth having two vertically disposed sides 84 and 86 connected together by a top surface 87. For purposes of this description, the teeth 83—83 in FIG. 4 and their defining surfaces are designated with subscript letters in accordance with their sequential order along the carrier 81. Facing side walls of adjacent teeth 83—83 define a conductor-receiving nest 88 having a base 89.

The movement of the carrier 81 is accomplished by any one of a number of known arrangements. For example, a pinion 92(see FIG. 2) connected to a shaft of a stepper motor 93 may be meshed with gear teeth 94 along a lower surface of the carrier. Or, the pinion may be attached to a shaft having a pulley which is belt driven.

In the operation of the escapement apparatus 20, a plurality of contiguously arrayed conductors 21—21 are fed into the guideway 61 from a prior station in which they have been tested and so arrayed. As can best be seen in FIG. 5, the conductors are positioned between the guideway surfaces 63 and 64 with end portions thereof supported on the shelf. The spring-biased pusher 76 is in engagement with the trailing one of the conductors to bias the array toward the exit end 67 of the guideway 61.

Figure 5:
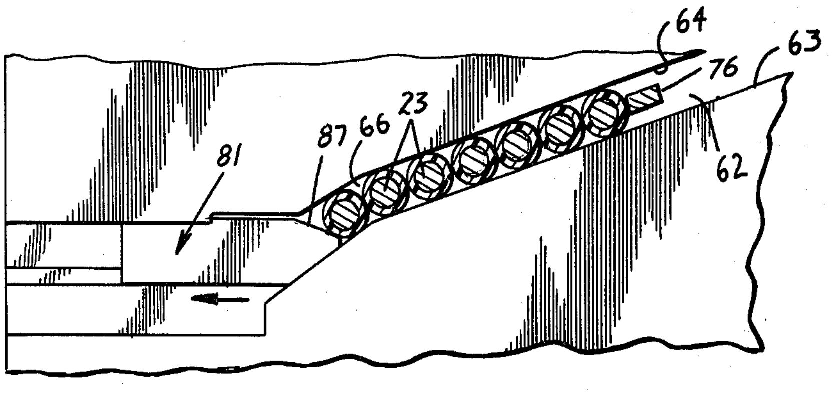
FIGS. 5-7 are a sequence of views showing the escapement apparatus in operation with ones of the conductor end portions being moved into the carrier.

As can be seen again in FIG. 5, the carrier 81 at the beginning of a sequence of operation is positioned so that an outwardly facing, crown surface 87 is positioned across the exit end 67 of the guideway 61. The conductor end portions 23—23 are moved downwardly by the pusher 76 until a leading one engages that surface 87. It should be observed from FIGS. 5 and 6 that the angle of inclination $\alpha_2$, of the second portion 66 of the guideway 61 is such that the angle formed with the crown surface 87 of the carrier 81 prevents the entrapment of the leading one of the conductors 21—21 therebetween. In fact as the carrier 81 is indexed to the left as seen in FIG. 5, the leading one of the conductors 21—21 is caused to move relative to the surface 87 and be positioned for descent into the leading one of the nests 88—88 which are formed in the carrier (see FIG. 6).

Figure 6:
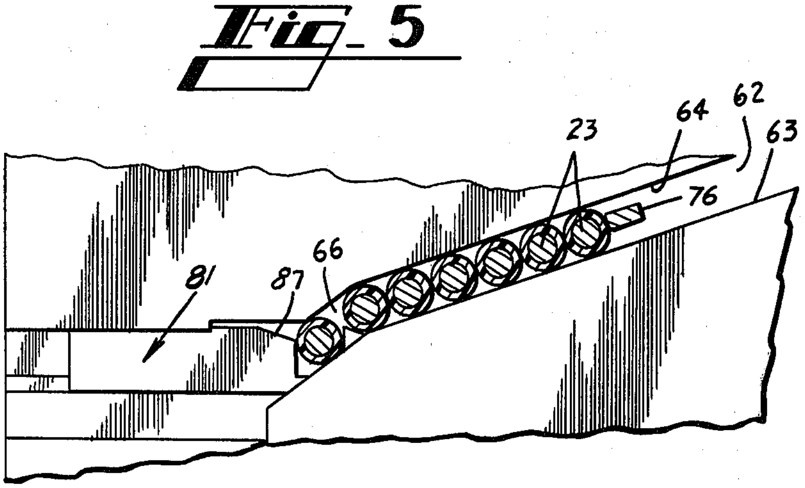
Figure 7:
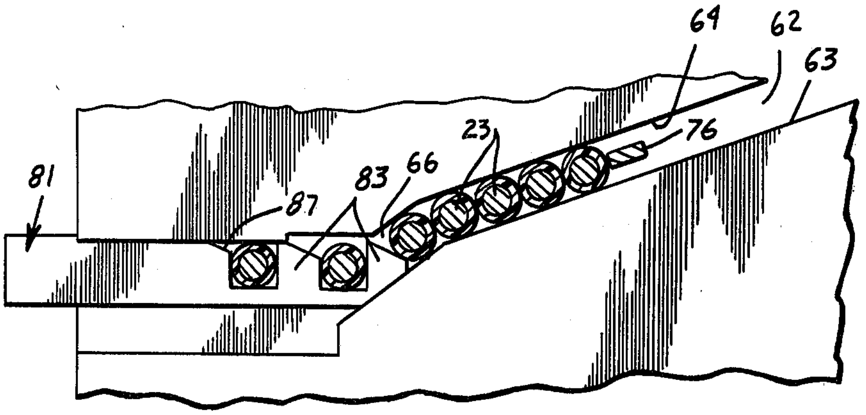

Of equal importance to the avoidance of entrapment of the leading one of the conductors 21—21 is the width of the exit end 67 of the guideway 61. As can be seen in FIGS. 5-7 and particularly in FIG. 4, the exit end 67 of the guideway 61 will only pass one of the conductors 21—21 at a time into the carrier 81. This avoids a malfunction of the apparatus 20 which could happen if more than one of the conductors could be positioned adjacent the exit end 67 of the guideway 61.

Viewing now FIG. 4, it can be seen that after the leading one of the end portions 23—23 of the conductors 21—21 has been moved into the leading one of the nests 88—88 in the carrier 81, the top surface 87*a* of a leading wedge-shaped portion 91 of the first one of the teeth in the carrier is positioned partially under the next one of the conductors. This leading portion 91 of the tooth and of succeeding teeth in effect acts as a gate to prevent the inadvertent descent of the next successive one of the end portions 23—23 of the conductors. Then as the carrier 81 is moved, the top surface 87 closes the exit end 67 completely and allows the conductor end portion 23 to move relative thereto into the next one of the nests 88—88.

Figure 8:
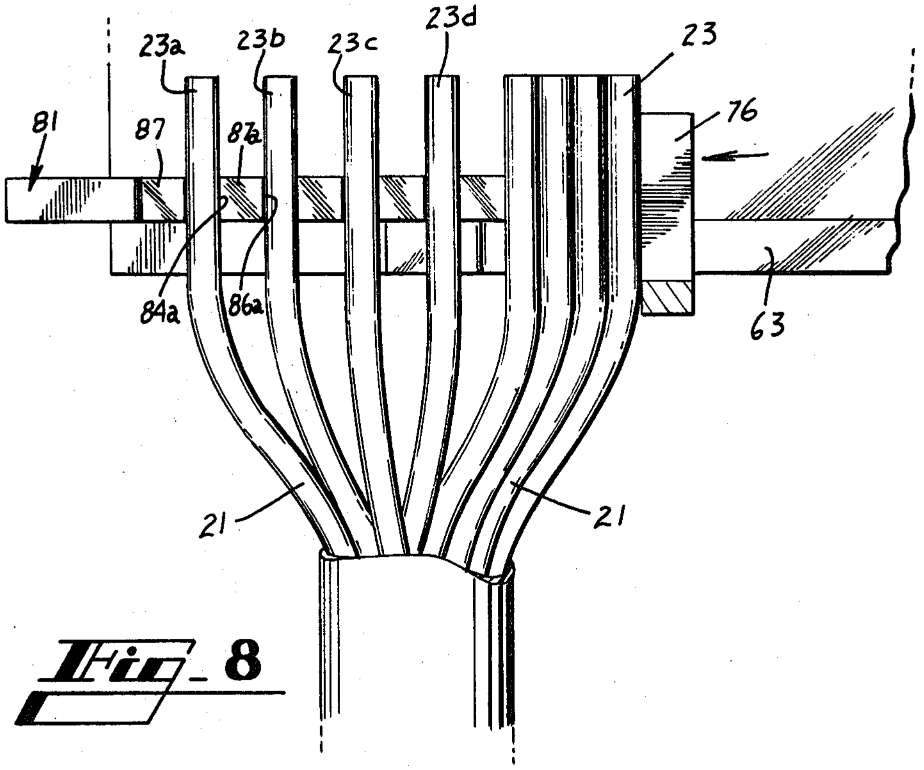
FIG. 8 is a plan view of the array of conductors in the escapement apparatus.

The movement of the end portions 23—23 of the conductors 21—21 along the guideway 61 and into spaced relation with one another in the carrier 81 is shown in FIG. 8. There the connector end portions 23*a*-23*d* have been positioned in nests 88*a* through 88*d* of the carrier 81 while the remaining one of the conductors are being biased by the pusher 76 toward the exit end 67.

As a result of the use of the escapement apparatus 20 of this invention, the conductor array is transformed from one in which the conductors are arrayed contiguously into one in which they are spaced apart in the carrier 81. As will be recalled, the spacing in the carrier 81 corresponds to that between the contact elements of the connector 22 to which the conductors are assembled at a subsequent station.

The velocity at which the carrier 81 is moved to align the nests 88—88 with the guideway exit 67 is important to the successful operation of the escapement device 20. Should the velocity be too high, ones of the conductors 21—21 may not have time to descend into nests of the carrier 81.

Another consideration is the rack velocity relative to the motion of the conductor array in the guideway 61. That motion is a function of the forces which are applied to the array by the spring-biased pusher 76 and by the frictional forces developed between the various elements. For example, the friction between a particular plastic which comprises the conductor insulation and the surfaces 63 and 64 affect the motion of the array in the guideway toward the exit end 67.

In order to insure the successful rearrangement of an array in cycle after cycle, the apparatus of this invention must include means for adjusting the carrier velocity. Spring wear, variations in conductor diameter as well as changes in the conductor insulation may individually or collectively require changes in the carrier velocity.

It is to be understood that the above-described arrangements are simply illustrative of the invention. Other arrangements may be devised by those skilled in the art which will embody the principles of the invention and fall within the spirit and scope thereof.

What we claim is:

1. Apparatus for rearranging a contiguous array of end portions of elongated insulated conductors in an array in which the conductors are on predetermined centers, said apparatus comprising:
   - a guideway for receiving end portions of a plurality of insulated conductors which extend from a cable and which are disposed contiguously in a substantially planar array, said guideway including a first portion which is inclined at a first angle to a horizontal axis and which receives the array, and a second portion including an exit from which conductors of the array are discharged seriatim, said second portion being inclined at a second angle to the horizontal axis, said second angle being greater than said first angle;
   - feed means for urging the array along said guideway toward said exit;
   - a carrier including a plurality of conductor-receiving nests which are spaced apart on the predetermined centers and gate means associated with each of said nests, said carrier including a plurality of spaced, upstanding teeth with said nest being formed between adjacent teeth and with each of said teeth having an outwardly facing crown surface, which is formed at an angle transverse of sidewalls that define said teeth, said gate means including a wedge-shaped portion of each tooth which is formed between said crown surface and one of said sidewalls of each said tooth; p1 mounting means for supporting said carrier for movement in a direction past said exit to allow each said nest and each said crown surface to be aligned seriatim with said exit and to cause said gate means to be oriented in a direction in which the carrier is moved, the direction of movement of said carrier being inclined to at least said second portion of said guideway; and
   - means for moving said carrier to align each of said nests with said exit, whereupon said feed means is effective to cause each successive leading conductor in said guideway to be disposed fully within the aligned nest, and to align each said crown surface with said exit, said angle of said crown surface being such that subsequent to the descent of each leading conductor into an aligned nest said gate means of the succeeding tooth protrudes into said exit of said guideway to prevent the inadvertent descent of the following conductor, and wherein said second portion of said guideway cooperates with each successive crown surface that is aligned with said exit to prevent entrapment of the leading conductor in the guideway between said each successive crown surface and surfaces which define said second portion of said guideway.

2. The apparatus of claim 1, wherein said means for moving said carrier includes means for adjusting the velocity of said carrier relative to the movement of the conductor array along said guideway to insure that each one of said nests receives a conductor as said carrier is moved past said exit of said guideway.

3. The apparatus of claim 1, wherein subsequent to a leading one of the conductors being escaped into said aligned nest, the moving of said carrier causes said wedge-shaped portion of the next successive tooth to be moved between the leading and the following conductor and causes an outwardly facing crown surface of said adjacent tooth to be moved past the following conductor until the succeeding nest is aligned with it to allow it to descend thereinto.

4. The apparatus of claim 1, wherein said second portion of said guideway is inclined to said first portion at an angle such that it communicates with said carrier along a distance which is substantially less than twice the outer diameter of one of the conductors.

5. The apparatus of claim 1, wherein each portion of said guideway is formed by two parallel surfaces which are spaced apart a distance that is slightly greater than the outer diameter of one of the insulated conductors, and the portions of the conductors are end portions extending from at least one side of said guideway to the cable.

* * * * *